(12) United States Patent
Zikeli et al.

(10) Patent No.: US 7,951,237 B2
(45) Date of Patent: May 31, 2011

(54) POLYMER COMPOSITION AND MOLDED ARTICLES PRODUCED THEREFROM

(75) Inventors: Stefan Zikeli, Regau (AT); Thomas Endl, Voecklabruck (AT); Michael Gert Martl, Frankfurt am Main (DE)

(73) Assignee: smartfiber AG, Rudolstadt (DE)

( * ) Notice: Subject to any disclaimer, the term of this patent is extended or adjusted under 35 U.S.C. 154(b) by 0 days.

(21) Appl. No.: 11/567,021

(22) Filed: Dec. 5, 2006

(65) Prior Publication Data

US 2007/0161311 A1   Jul. 12, 2007

Related U.S. Application Data

(62) Division of application No. 10/204,108, filed as application No. PCT/EP01/00132 on Jan. 8, 2001, now abandoned.

(30) Foreign Application Priority Data

Feb. 21, 2000   (DE) .................................. 100 07 794

(51) Int. Cl.
| | |
|---|---|
| C08L 5/08 | (2006.01) |
| C08L 5/10 | (2006.01) |
| C08L 5/00 | (2006.01) |
| C08L 97/02 | (2006.01) |
| C08L 1/00 | (2006.01) |
| C09D 105/08 | (2006.01) |
| C09D 105/10 | (2006.01) |
| C09D 105/00 | (2006.01) |
| C09D 197/02 | (2006.01) |
| C09J 105/08 | (2006.01) |
| C09J 105/10 | (2006.01) |
| C09J 105/00 | (2006.01) |
| C09J 197/02 | (2006.01) |
| C08L 3/00 | (2006.01) |
| C09D 101/00 | (2006.01) |
| C09D 103/00 | (2006.01) |
| C09J 101/00 | (2006.01) |
| C09J 103/00 | (2006.01) |

(52) U.S. Cl. ................ 106/162.2; 106/162.5; 106/162.9

(58) Field of Classification Search ............... 106/162.2, 106/162.5, 162.9
See application file for complete search history.

(56) References Cited

U.S. PATENT DOCUMENTS

| | | | |
|---|---|---|---|
| 1,935,344 A | 11/1933 | Andrews et al. | |
| 3,367,926 A | 2/1968 | Voeks | |
| 3,400,004 A * | 9/1968 | Corry | 442/214 |
| 4,055,702 A | 10/1977 | Guthrie et al. | |
| 4,144,097 A | 3/1979 | Chambers et al. | |
| 4,246,221 A * | 1/1981 | McCorsley, III | 264/203 |
| 4,333,484 A | 6/1982 | Keritsis | 131/359 |
| 4,421,583 A | 12/1983 | Aldred et al. | |
| 4,562,110 A | 12/1985 | Tong | |
| 4,606,824 A * | 8/1986 | Chu et al. | 210/635 |
| 4,663,163 A * | 5/1987 | Hou et al. | 210/645 |
| 4,791,063 A * | 12/1988 | Hou et al. | 435/243 |
| 4,908,137 A * | 3/1990 | Chen et al. | 210/679 |
| 4,994,285 A | 2/1991 | Hisano et al. | |
| 5,045,210 A * | 9/1991 | Chen et al. | 210/679 |
| 5,049,690 A | 9/1991 | Deschler et al. | |
| 5,059,654 A * | 10/1991 | Hou et al. | 525/54.1 |
| 5,205,863 A | 4/1993 | Elion | |
| 5,219,646 A * | 6/1993 | Gallagher et al. | 442/361 |
| 5,244,945 A | 9/1993 | Elion | 524/10 |
| 5,288,318 A * | 2/1994 | Mayer et al. | 106/126.3 |
| 5,330,567 A | 7/1994 | Zikeli et al. | |
| 5,472,569 A | 12/1995 | Nicolucci et al. | |
| 5,565,007 A | 10/1996 | Schrell et al. | |
| 5,589,125 A | 12/1996 | Zikeli et al. | |
| 5,626,810 A | 5/1997 | Zikeli et al. | |
| 5,742,569 A * | 4/1998 | Yamamoto et al. | 369/30.18 |
| 5,759,569 A * | 6/1998 | Hird et al. | 424/443 |
| 5,766,746 A | 6/1998 | Kampl et al. | |
| 5,906,926 A | 5/1999 | Keunecke et al. | |
| 5,939,000 A | 8/1999 | White et al. | |
| 6,103,790 A | 8/2000 | Cavaille et al. | |
| 6,344,077 B1 * | 2/2002 | Hong | 106/162.2 |
| 7,123,280 B2 * | 10/2006 | Koyama et al. | 347/221 |
| 2004/0175407 A1 * | 9/2004 | McDaniel | 424/423 |
| 2005/0249853 A1 * | 11/2005 | Merrill et al. | 426/582 |
| 2005/0271789 A1 * | 12/2005 | Merrill et al. | 426/582 |
| 2006/0083820 A1 * | 4/2006 | Merrill et al. | 426/36 |
| 2006/0083821 A1 * | 4/2006 | Merrill et al. | 426/36 |
| 2006/0083822 A1 * | 4/2006 | Merrill et al. | 426/36 |

FOREIGN PATENT DOCUMENTS

CN   1067279   12/1992

(Continued)

OTHER PUBLICATIONS

D. Poncelet. Production of alginate beads by emulsification/internal gelation. I. Methodology. Applied Microbiology and Biotechnology. vol. 38, No. 1 pp. 39-45 (1992).*

(Continued)

*Primary Examiner* — C. Melissa Koslow
*Assistant Examiner* — Matthew E Hoban
(74) *Attorney, Agent, or Firm* — Michael Best & Friedrich LLP

(57) ABSTRACT

The invention relates to a polymer composition comprising a biologically degradable polymer and a material from sea plants and/or shells of sea animals or at least two components selected from the group consisting of saccharides and the derivatives thereof, proteins, amino acids, vitamins and metal ions. The invention additionally relates to a molded article comprising said polymer composition. Said molded article may be used packaging material or fibrous material, in the form of fibrous material as mixing component for the production of yarns, and in the form of fibrous material for the production of nonwoven fabrics or woven fabrics.

26 Claims, 3 Drawing Sheets

FOREIGN PATENT DOCUMENTS

| | | |
|---|---|---|
| DE | 3620440 | 12/1987 |
| DE | 4027786 | 4/1992 |
| DE | 19544097 | 7/1997 |
| DE | 692 17 385 T2 | 8/1997 |
| DE | 196 18 271 A1 | 11/1997 |
| DE | 19635707 | 4/1998 |
| DE | 19757958 | 7/1999 |
| DE | 19803107 | 7/1999 |
| DE | 198 49 185 | 4/2000 |
| EP | 0356419 | 2/1990 |
| EP | 0538977 | 4/1993 |
| EP | 0574870 | 12/1993 |
| EP | 0603602 | 6/1994 |
| EP | 0888818 | 1/1999 |
| FR | 2 685 679 A1 | 7/1993 |
| JP | 1228916 | 9/1989 |
| JP | 03269059 | 11/1991 |
| JP | 06163088 | 6/1994 |
| JP | 07305294 A | 11/1995 |
| JP | 08001695 | 1/1996 |
| JP | 10-231241 | 9/1998 |
| JP | 2002069475 | 3/2002 |
| WO | WO 93/12986 | 7/1993 |
| WO | 96/33221 | 10/1996 |
| WO | 96/33934 | 10/1996 |
| WO | 98/07911 | 2/1998 |
| WO | WO 98/27151 | 6/1998 |
| WO | 98/58015 | 12/1998 |
| WO | 99/19555 | 4/1999 |

OTHER PUBLICATIONS

Lemoine. Preparation and characterization of alginate microspheres containing a model antigen. International Journal of Pharmaceutics. vol. 176, Issue 1, Dec. 30, 1998, pp. 9-19.*

S. Iannace, et al. "Biocomposites Based on Sea Algae Fibers and Biodegradable Thermoplastic Matrices", Journal of Applied Polymer Science, vol. 73, 583-592, 1999.

United States Patent Office Action for U.S. Appl. No. 10/204,108 dated Feb. 25, 2005 (9 pages).

United States Patent Office Action for U.S. Appl. No. 10/204,108 dated Oct. 20, 2005 (17 pages).

United States Patent Office Action for U.S. Appl. No. 10/204,108 dated Jul. 5, 2006 (8 pages).

* cited by examiner

POLYMER COMPOSITION AND MOLDED ARTICLES PRODUCED THEREFROM

CROSS-REFERENCE TO RELATED APPLICATIONS

This application is a divisional of U.S. patent application Ser. No. 10/204,108, filed Nov. 26, 2002, which is a 35 U.S.C. §371 application of and claims priority to International Application No. PCT/EP01/00132 filed Jan. 8, 2001, which claims priority to German Application No. 100 07 794.3 filed Feb. 21, 2000. This application claims the priority of each of these applications, and fully incorporates the subject matter thereof.

INTRODUCTION

The invention relates to a polymer composition comprising a biologically degradable polymer, as well as to the use thereof of the production of a molded article, the molded article produced from said polymer composition, a method for the production thereof and the use thereof, and to an article of clothing comprising the molded article in form of fibers.

Polymer compositions with different additives for the production of molded articles are known.

U.S. Pat. No. 5,766,746 describes a nonwoven fabric made of cellulose fibers, which comprise a flame-resistant phosphoric component.

U.S. Pat. No. 5,565,007 describes modified rayon fibers, with a modifying agent for improving the dyeing properties of the fibers.

U.S. Pat. No. 4,055,702 discloses melt-spun, cold-drawn fibers from a synthetic organic polymer with additives. Said additives may be receptors, flame-resistant rendering agents, antistatic agents, stabilizers, mildew inhibitors or antioxidants.

"Lenzinger Berichte", 76/97, page 126 moreover discloses a lyocell fiber spun from a cellulose solution in N-methylmorpholine-N-oxide (hereinafter called "NMMNO"), into which may be incorporated 0.5 to 5 weight-%, relative to the cellulose weight, of cross-linking agents for improving the wet abrasion value. It is additionally described to incorporate lyocell fibers, carboxymethylchitin, carboxymethylchitosan or polyethylene imine for improving the fungicidal properties, polyethylene imine for the adsorption of metal ions and dyes, hyaluronic acid for improving the bactericidal properties, xanthene, guar, carubin, bassorin or starch for improving hydrophilicity, water adsorption and water vapor permeability, or starch for the accelerated enzymatic hydrolysis.

WO 98/58015 describes a composition containing fine particles of solid matter for the addition to a formable solution of cellulose in an aqueous tertiary amine oxide. The composition is made of solid particles, tertiary amine oxide, water and at least another substance. Said other substance may be a stabilizer or a dispersing agent. The solid particles may be pigments.

Furthermore, it is known that high concentrations of iron and transitional metals influence the stability of a spinning mass of cellulose, NMMNO and water. High iron concentrations decrease the disintegration temperature of the solution to such an extent that explosion-like disintegration reactions of the solution may occur. The disintegration and stabilization of cellulose solved in NMMNO is described in "Das Papier", F. A. Buitenhuijs 40. year, volume 12, 1986, which also mentions the influence of iron—Fe(III) on said cellulose solutions. With an addition of 500 ppm of Fe(III) more than 40% of the NMMNO were transformed into the disintegration product N-methylmorpholine ("NMM"), whereby the addition of $Cu^{+2}$ also reduces the stability of the solution. With the addition of copper to an NMMO cellulose solution free of copper the disintegration temperature (T onset ° C.) was reduced from 175° C. to 114° C. in the presence of 900 mg copper/kg of the mass. Moreover described is the positive effect of stabilizers such as propyl gallate and ellagic acid.

The addition of additives to fibers moreover causes difficulties in preserving the properties of the fibers such as mechanical stabilities, fiber elongations, loop strength, abrasion resistance, dye receptivity.

JP 1228916 describes a film made of two layers of woven material or nonwoven fabric, between which fine flakes of algae material such as Rhodophyceae are filled by means of adhesives or by hot welding. Thus, a film is obtained which, when used, improves the health.

Said film has, however, the disadvantage that the finely grounded (comminuted) algae material is present in hollow spaces between said two layers, so that the algae material escapes when the film is torn and is separated from the environment by the layers.

U.S. Pat. Nos. 4,421,583 and 4,562,110 describe a method, wherein fiber material is produced from alginate. For this purpose, alginate is obtained from the sea plants by means of an extraction method, and the so obtained soluble alginate is directly spun to form fibers.

DE 19544097 describes a method of producing molded articles from polysaccharide mixtures by dissolving cellulose and a second polysaccharide in an organic polysaccharide solvent mixable with water, which may likewise contain a second solvent, by molding the solution under pressure through a nozzle to form molded articles and by solidifying the molded articles by means of coagulation in a coagulating bath. Apart from cellulose, hexoses with glycosidic 1,4 and 1,6 linkage, uronic acids and starch, especially pull ulan, carubin, buaran, hyaluronic acid, pectin, algin, carrageenan or xanthene are mentioned therein as second polysaccharides. Moreover, it is described that, apart from a second polysaccharide, also a third polysaccharide, preferably chitin, chitosan or, respectively, a corresponding derivative may be used. The molded articles obtained according to this method are used as means for binding water and/or heavy metals, as fiber having bactericidal and/or fungicidal properties or as yarn with an increased degradation velocity in the stomach of ruminants.

The use of nucleation agents in the production of molded articles from thermoplastic high polymers, especially α-olefinic polymers is described in U.S. Pat. No. 3,367,926. As nucleation agents amino acids, the salts thereof and proteins are, inter alia, mentioned.

For reducing the fibrillation tendency in cellulosic molded articles it is known to apply defibrillation agents on the freshly spun or dried fiber in a subsequent treatment step. All previously known defibrillation agents are cross-linking agents.

According to EP-A-O 538 977 cellulose fibers are treated in an alkaline medium with a chemical reagent comprising 2 to 6 functional groups capable of reacting with cellulose, in order to reduce the fibrillation tendency.

Another method for the reduction of the fibrillation tendency of cellulosic molded articles by means of a textile auxiliary agent is described in WO 99/19555. So far a solution for reducing the fibrillation of the cellulose fibers during the spinning process has not as yet been found.

DETAILED DESCRIPTION

Figure 1:
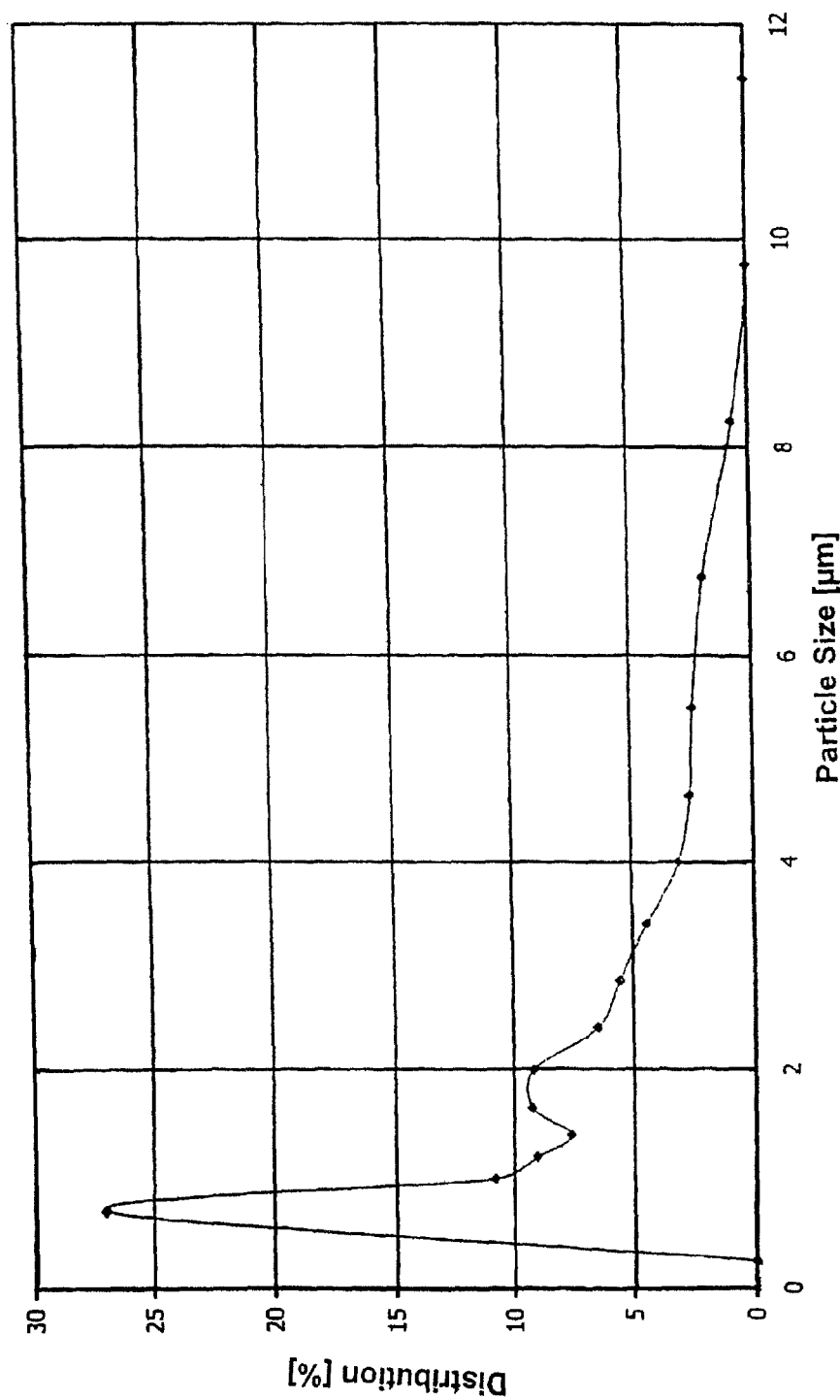
FIG. 1 is a graphical representation of a typical particle size distribution of material from sea plants and/or shells of sea animals that has been disintegrated by means of jet mills with static or rotating internal or external classifiers.

It is, therefore, the object of the present invention to provide a polymer composition containing an additive, with a good stability and processability, as well as a molded article produced therefrom having a small fibrillation tendency, and a method for the production thereof.

This object is solved by a polymer composition comprising a biologically degradable polymer and a material from sea plants and/or shells of sea animals, by a molded article produced therefrom as well as by a method for the production thereof according to claims 1 to 6 and 12 to 25.

The object is additionally solved by a polymer composition comprising a biologically degradable polymer and at least two components selected from the group consisting of saccharides and the derivatives thereof, proteins, amino acids, vitamins and metal ions, by a molded article produced therefrom and by a method for the production thereof according to claims 7 to 25.

The biologically degradable polymer is preferably selected from the group consisting of cellulose, modified cellulose, latex, vegetable or animal protein, especially cellulose, and mixtures thereof. Polyamides, polyurethanes and mixtures thereof may likewise be used, as far as they are biologically degradable. The polymer composition according to the invention and the molded article produced therefrom preferably contain no polymers which are not biologically non-degradable, or mixtures thereof.

The polymer compositions according to the invention may also contain polymers which are not biologically degradable. Certain polymer solvents such as DMAc, DMSO or DMF etc. can also solve synthetic polymers such as aromatic polyamides (aramides), polyacrylonitrile (PACN) or polyvinyl alcohols (PVA), which, again, may be combined to form polymer compositions in combination with known cellulose solvents such as LiCl/DMAc, DMSO/PF, tertiary amine oxides/water.

Examples for modified cellulose include carboxyethyl cellulose, methyl cellulose, nitrate cellulose, copper cellulose, viscose xanthogenate, cellulose carbamate and cellulose acetate. Examples for fibers from polycondensation and polymerization products are polyamides substituted with methyl, hydroxy or benzyl groups. Examples for polyurethanes are those formed on the basis of polyesterpolyolen.

The sea plant material is preferably selected from the group consisting of algae, kelp and seaweed, especially algae. Examples for algae include brown algae, green algae, red algae, blue algae or mixtures thereof. Examples for brown algae are *Ascophyllum* spp., *Ascophyllum nodosum*, *Alaria esculenta*, *Fucus serratus*, *Fucus spiralis*, *Fucus vesiculosus*, *Laminaria saccharina*, *Laminaria hyperborea*, *Laminaria digitata*, *Laminaria echroleuca* and mixtures thereof. Examples for red algae include *Asparagopsis armata*, *Chondrus cripus*, *Maerl beaches*, *Mastocarpus stellatus*, *Palmaria palmata* and mixtures thereof. Examples for green algae are *Enteromorpha compressa*, *Ulva rigida* and mixtures thereof, Examples for blue algae are *Dermocarpa, Nostoc, Hapalosiphon, Hormogoneae, Porchlorone*. A classification of algae can be inferred from the Botanic Textbook for Colleges [*Lehrbuch der Botanik für Hochschulen*] E. Strasburger; F. Noll; H. Schenk; A. F. W. Schimper; 33. edition, Gustav Fischer Verlag, Stuttgart-Jena-New York; 1991.

The sea plant material can be obtained in different ways. At first, it is harvested, whereby there are three different harvesting methods:

1. the sea plant material washed ashore is collected,
2. the sea plants are cut from stones, or
3. the sea plants are collected in the sea by divers.

The sea plant material obtained according to the third method has the best quality and is rich in vitamins, minerals, minor elements and polysaccharides. For the purpose of the present invention the sea plant material harvested according to this method is preferably used.

The harvested material can be processed in different ways. The sea plant material can be dried at temperatures of up to 450° C. and grounded by using ultrasound, wet ball mills, pin-type mills or counterrotating mills, whereby a powder is obtained, which may, if required, still be subjected to cycloning for the classifying thereof. A so obtained powder may be used according to the invention.

Said sea plant material powder may, in addition, be subjected to an extraction method, for instance, with vapor, water or an alcohol such as ethanol, whereby a liquid extract is obtained. Said extract may likewise be used according to the invention.

The harvested sea plant material can moreover be subjected to a cryocomminution, whereby it is comminuted into particles of approximately 100 μm at −50° C. If desired, the so obtained material may additionally be comminuted, whereby particles having a size of approximately 6 to approximately 10 μm are obtained.

The material from the outer shell of sea animals is preferably selected out of sea sediments, grounded shells of crabs or mussels, lobsters, crustaceans, shrimps, corals.

A typical composition of a mixture of natural origin is shown in table 1.

TABLE 1

| Components (%) | |
|---|---|
| Vitamins | 0.2% |
| Proteins | 5.7% |
| Fats | 2.6% |
| Humidity | 10.7% |
| Ash | 15.4% |
| Carbohydrates | 65.6% |

Minerals of a mixture of natural origin according to table 1 are shown in table 2.1.

TABLE 2.1

| ELEMENT | Concentration [mg/kg] |
|---|---|
| Sodium | 41,800 |
| Magnesium | 2,130 |
| Calcium | 19,000 |
| Manganese | 1,235 |
| Phosphor | 2,110 |
| Mercury | 2 |
| Fluorine | 326 |
| Iron | 895 |
| Nickel | 35 |
| Copper | 6 |
| Chlorine | 36,800 |

TABLE 2.1-continued

| ELEMENT | Concentration [mg/kg] |
|---|---|
| Iodine | 624 |
| Lead | <1 |
| Zinc | 35 |
| Aluminum | 1,930 |
| Sulfur | 15,640 |
| Molybdenum | 16 |
| Cobalt | 12 |
| Tin | <1 |
| Boron | 194 |
| Strontium | 749 |

Minerals of a mixture (humidity 94%, ignition residue 90%) of natural origin are shown in table 2.2.

TABLE 2.2

| ELEMENT | Concentration [mg/kg] |
|---|---|
| Sodium | 5,100 |
| Magnesium | 24,000 |
| Calcium | 350,000 |
| Manganese | 125 |
| Phosphor | 800 |
| Mercury | <0.3 |
| Fluorine | 200 |
| Iron | 2,040 |
| Nickel | 14 |
| Copper | 10 |
| Chlorine | 1,880 |
| Iodine | 181 |
| Lead | 460 |
| Zinc | 37 |
| Aluminum | <5 |
| Sulfur | 4,500 |
| Molybdenum | 39 |
| Cobalt | 6 |
| Tin | <5 |
| Boron | 17 |

The material from sea animal shells can, in the case of sea sediments, be used directly. If materials from the shells of crabs or mussels, lobsters, crustaceans, shrimps are used, the same is grounded.

Mixtures from sea plant materials and shells of sea animals as well as the extracted products thereof may likewise be used. The quantitative composition of sea plant materials and the shells of sea animals is preferably 50 weight-% to 50 weight-%. Sea plant materials are preferably used according to the invention.

The material from sea plants and/or shells of sea animals may be present in the polymer composition and the molded article produced therefrom in an amount of 0.1 to 30 weight-%, preferably 0.1 to 15 weight-%, more preferably 1 to 8 weight-%, especially 1 to 4 weight-%, based on the weight of the biologically degradable polymer. Especially if the molded article is present in the form of a fiber, the amount of material from sea plants and/or shells of sea animals is preferably 0.1 to 15 weight-%, especially 1 to 5 weight-%.

An example for a material from sea plants used according to the invention is a powder from *Ascophyllum nodosum* having a particle size of 95%<40 μm, which contains 5.7 weight-% protein, 2.6 weight-% fat, 7.0 weight-% fibrous components, 10.7 weight-% humidity, 15.4 weight-% ash and 58.6 weight-% carbohydrates. It moreover contains vitamins and minor elements such as ascorbic acid, tocopherols, carotene, barium, niacin, vitamin K, riboflavin, nickel, vanadium, thiamin, folic acid, folinic acid, biotin and vitamin $B_{12}$. In addition, it contains amino acids such as alanine, arginine, asparagic acid, glutamic acid, glycin, leucine, lysine, serine, threonine, tyrosine, valine and methionine.

According to another embodiment the polymer composition comprises a biologically degradable polymer and at least two components selected from the group consisting of saccharides and the derivatives thereof, proteins, amino acids, vitamins and metal ions. The components may be of synthetic nature or of a natural origin. Said components may be used in a dried form or with a humidity, which preferably ranges between 5 and 15%.

In a preferred embodiment the polymer composition comprises a biologically degradable polymer and at least three components, especially preferably at least four components, selected from the group consisting of saccharides and the derivatives thereof, proteins, amino acids, vitamins and metal ions.

The polymer composition comprises especially preferably a biologically degradable polymer and at least two components selected from the group consisting of saccharides and the derivatives thereof and amino acids.

The at least two components selected from the group consisting of saccharides and the derivatives thereof, proteins, amino acids, vitamins and metal ions may be present in the polymer composition and the molded article produced therefrom in an amount of 0.1 to 30 weight-%, preferably 0.1 to 15 weight-%, especially in an amount of 4 to 10 weight-%, based on the weight of the biologically degradable polymer.

The saccharides may be used in amounts of 0.05 to 9 weight-%, preferably in amounts of 2 to 6 weight-%, the vitamins in amounts of 0.00007 to 0.04 weight-%, preferably in amounts of 0.003 to 0.03 weight-%, the proteins and/or amino acids in amounts of 0.005 to 4 weight-%, preferably in amounts of 0.2 to 0.7 weight-%, and the metal ions and the counterions thereof in amounts of 0.01 to 9 weight-%, preferably in amounts of 0.5 to 1.6 weight-%, based on the weight of the biologically degradable polymer.

The biologically degradable polymer is preferably selected from the same group as in the preceding embodiment.

The saccharides or the derivatives thereof used may be selected from the group consisting of monosaccharides, oligosaccharides and polysaccharides. Mixtures containing alginic acid, laminarin, mannitol and methylpentosanes are preferably used.

The used proteins contain preferably alanine, arginine, asparagic acid, glutamic acid, glycin, leucine, lysine, serine, threonine, tyrosine, valine and methionine.

The amino acids are preferably the same ones contained in the proteins as used. Furthermore, the used vitamins may be selected from the group consisting of ascorbic acid, tocopherol, carotene, niacin (vitamin B3), phytonadione (vitamin K), riboflavin, thiamin, folic acid, folinic acid, biotin, retinol (vitamin A), pyridoxine (vitamin B6) and cyanocobalamin (vitamin $B_{12}$).

The metal ions may be selected from the group consisting of aluminum, antimony, barium, boron, calcium, chromium, iron, germanium, gold, potassium, cobalt, copper, lanthanum, lithium, magnesium, manganese, molybdenum, sodium, rubidium, selenium, silicon, thallium, titan, vanadium, tungsten, zinc and tin.

The counterions of the metal ions may, for example, be fluoride, chloride, bromide, iodide, nitrate, phosphate, carbonate and sulfate. The amount of metal ions or, respectively, the pertinent counterions is adjusted such that, when the at least two components or, respectively, the polymer composition are ashed, an ash content in the range of 5-95%, preferably a range of 10-60% is formed.

For the purposes according to the invention particles of the material from sea plants and/or shells of sea animals or the at least two components selected from the group consisting of saccharides and the derivatives thereof, proteins, amino acids, vitamins and metal ions in the particle-size range of 200 to 400 µm, preferably of 150 to 300 µm may be used. Smaller sized particles may also be used, such as at 1 to 100 µm, preferably 0.1 to 10 µm, more preferably 0.1 to 7 µm, especially 1 to 5 µm (measuring method: laser diffraction apparatus: Sympatec Rhodos). Also grain size mixtures of a uniform material or, respectively, different algae material may be used.

In order to obtain the material from sea plants and/or shells of sea animals or the at least two components in this fineness, the material from sea plants and/or shells of sea animals or the at least two components may be grounded, for instance, with commercially available pin-type mills, whereupon the fine fraction is then separated by means of corresponding classifiers. Such a classifying process for toner for the development of electrostatic pictures is described in DE 19803107, whereby a fine fraction is classified out of the product at approximately 5 µm.

Given this process, however, only the fine fraction can be obtained, and the main fraction is thereby not used in the polymer composition according to the invention.

Another possibility to obtain the material from sea plants and/or shells of sea animals or the at least two components in the required particle size resides in disintegrating the material from sea plants and/or shells of sea animals or the at least two components by means of jet mills with static or rotating internal or external classifiers. Jet mills typically comprise a flat cylindrical mill chamber, around which a plurality of jet nozzles distributed about the periphery are arranged. The grinding is substantially based on a mutual exchange of kinetic energy. The disintegration achieved by particle impact is followed by a classifying zone towards the center of the mill chamber, whereby the fine fraction is discharged by means of static or rotating internal or external classifiers. The coarse fraction remains in the milling space by means of centrifugal forces and is further grounded. A portion of the components being hard to mill may be discharged from the milling space through suitable apertures. Corresponding jet mills are described, for example, in the U.S. Pat. No. 1,935,344, in EP 888818, EP 603602, DE 3620440.

A typical particle size distribution is shown in FIG. 1.

The molded articles according to the invention can be produced from the polymer composition according to the invention with conventional methods, whereby the biologically degradable polymer and the material from sea plants and/or shells of sea animals or the at least two components, selected from the group consisting of saccharides and the derivatives thereof, proteins, amino acids, vitamins and metal ions are at first mixed to produce the polymer composition and the molded article can then be produced.

The continuous or discontinuous mixing of the biologically degradable polymer and the material from sea plants and/or shells of sea animals or the at least two components, selected from the group consisting of saccharides and the derivatives thereof, proteins, amino acids, vitamins and metal ions can take place with apparatus and on the basis of methods described in WO 96/33221, U.S. Pat. No. 5,626,810 and WO 96/33934.

The molded article according to the invention especially preferably provided in the form of fibers, most preferably in the form of cellulose fibers. The molded article according to the invention may also be provided in the form of an endless filament, or membrane, or in the form of a hose or a flat film.

Methods of producing the cellulose fibers according to the invention such as the lyocell or NMMO methods, the rayon or viscose methods or the carbamate method are known.

The lyocell method may be performed according to the following description. For producing a moldable mass and the cellulose fibers according to the invention a solution from cellulose, NMMNO and water is produced by first forming a suspension from cellulose, NMMNO and water, whereby said suspension is continuously transported by rotating elements over a heat exchange surface in a layer having a thickness of 1 to 20 mm and under a reduced pressure. During this process water is evaporated until a homogenous cellulose solution is formed. The so obtained cellulose solutions may contain an amount of cellulose of 2 to 30 weight-%, an amount of NMMNO of 68 to 82 weight-% and an amount of water of 2 to 17 weight %. If desired, additives like anorganic salts, anorganic oxides, finely distributed organic substances or stabilizers may be added to said solution.

The material from sea plants and/or shells of sea animals or the at least two components, selected from the group consisting of saccharides and the derivatives thereof, proteins, amino acids, vitamins and metal ions are then continuously or discontinuously added to the so obtained cellulose solution in the form of powder, a powder suspension or in a liquid form, as extract or suspension.

In dependence on the method the material from sea plants and/or shells of sea animals or the at least two components, selected from the group consisting of saccharides and the derivatives thereof, proteins, amino acids, vitamins and metal ions may also be added after or during the continuous disintegration of the dry cellulose, e.g. in the form of algae material in the original size, as powder or highly concentrated powder suspension. The powder suspension can be produced in water or any optional solvent in the desired concentration required for the method.

Furthermore, it is possible to subject the material from sea plants and/or shells of sea animals or the at least two components, selected from the group consisting of saccharides and the derivatives thereof, proteins, amino acids, vitamins and metal ions to a pulping process with simultaneous disintegration, or to feed to a refiner. The pulping can be carried out either in water, in caustic solutions or in the solvent required for dissolving the cellulose at a later stage. Here, too, the material from sea plants and/or shells of sea animals or the at least two components, selected from the group consisting of saccharides and the derivatives thereof, proteins, amino acids, vitamins and metal ions may be added in a solid, powdery, suspension-like or in liquid form.

In the presence of a derivatization agent and/or a solvent known for the dissolving process the polymer composition enriched with the material from sea plants and/or shells of sea animals or the at least two components, selected from the group consisting of saccharides and the derivatives thereof, proteins, amino acids, vitamins and metal ions can be transferred into a moldable extrusion mass.

Another possibility of adding the material from sea plants and/or shells of sea animals or the at least two components, selected from the group consisting of saccharides and the derivatives thereof, proteins, amino acids, vitamins and metal ions resides in the addition during a continuously controlled dissolving process as is described in EP 356419, U.S. Pat. No. 5,049,690 and U.S. Pat. No. 5,330,567.

Alternatively, the addition may be carried out discontinuously by obtaining a master batch of the cellulose solution. Preferably the material from sea plants and/or shells of sea animals or the at least two components, selected from the group consisting of saccharides and the derivatives thereof, proteins, amino acids, vitamins and metal ions is added continuously.

The material from sea plants and/or shells of sea animals or the at least two components, selected from the group consisting of saccharides and the derivatives thereof, proteins, amino acids, vitamins and metal ions may be added in any other stage of the production process for the molded article. It can, for instance, be fed into a pipeline system, where it is correspondingly mixed by static mixing elements or, respectively, stirring elements such as known inline refiners or homogenizers, e.g. apparatus from Ultra Turrax, positioned therein. If the process is carried out in the continuous batch operation, e.g. by means of a stirred vessel cascade, the algae material can be introduced in a solid, powdery, suspension-like or liquid form at the point which is optimal for the process. The fine distribution can be achieved with known stirring elements adjusted to the method.

In dependence on the applied particle size the formed incorporated extrusion or spinning mass can be filtrated prior or after the incorporation. In response to the fineness of the applied product the filtration may also be omitted in spinning methods using large nozzle diameters.

If the spinning masses are very sensitive, the material can, in a suited form, directly be fed upstream of the spinning nozzle or the extrusion die via an injection location.

If the algae material or the at least two components, selected from the group consisting of saccharides and the derivatives thereof, proteins, amino acids, vitamins and metal ions are liquid, it is additionally possible to feed them to the continuously spun thread during the spinning process.

The so obtained cellulose solution is spun according to conventional methods such as the dry-jet-wet method, the wet-spinning method, the melt-blown method, the pot spinning method, the funnel spinning method or the dry spinning method. When the spinning takes place according to the dry-jet-wet spinning method, the yarn sheet can also be cooled in the air gap between the nozzle and the coagulating bath by quenching. An air gap of 10-50 mm has proved to be suitable. The parameters for the cooling air are preferably air temperatures of 5-35° C. with a relative humidity of up to 100%. Patent documents U.S. Pat. Nos. 5,589,125 and 5,939,000 as well as EP 0574870 B1 and WO 98/07911 describe spinning methods for the production of cellulose fibers according to the NMMO method.

If required, the formed molded articles are subjected to the conventional subsequent chemical fiber treatment methods for filaments or staple fibers.

Obtained is a cellulose fiber according to the invention with a material from sea plants and/or shells of sea animals or with at least two components, selected from the group consisting of saccharides and the derivatives thereof, proteins, amino acids, vitamins and metal ions, preferably at least three components, especially preferably at least four components.

Apart from the spinning method also extrusion methods for the production of flat films, round films, skins (sausage skins) and membranes can be used.

The viscose method can be carried through as follows. Pulp with approximately 90 to 92 weight-% of α-cellulose is treated with aqueous NaOH. Afterwards the cellulose is transformed into cellulose xanthogenate by means of conversion with carbon disulfide, and a viscose solution is obtained by adding aqueous NaOH under constant stirring. Said viscose solution contains approximately 6 weight-% cellulose, 6 weight-% NaOH and 32 weight-% carbon disulfide, based on the cellulose content. After the suspension was stirred, the material from sea plants and/or shells of sea animals or the at least two components, selected from the group consisting of saccharides and the derivatives thereof, proteins, amino acids, vitamins and metal ions are added either as powder or liquid extract. If desired, common additives such as surfactants, dispersing agents or stabilizers can be added.

The material from sea plants and/or shells of sea animals or the at least two components, selected from the group consisting of saccharides and the derivatives thereof, proteins, amino acids, vitamins and metal ions can, again, be added at any stage of the process.

The so obtained solution is then spun to form fibers, as is, for instance, described in U.S. Pat. No. 4,144,097.

The carbamate method can be carried out as follows. For this purpose, cellulose carbamate is produced from pulp with approximately 90 to 95 weight-% of α-cellulose, as is described, for example, in U.S. Pat. No. 5,906,926 or in DE 19635707. Alkali cellulose is thereby produced from the applied pulp by treating it with aqueous NaOH. After the defibration the alkali cellulose is subjected to maturing and the caustic soda solution is then washed out. The so activated cellulose is mixed with urea and water and is introduced into a solvent in a reactor. The so obtained mixture is heated. The obtained carbamate is separated and a carbamate spinning solution is produced therefrom, which is described in DE 19757958. The material from sea plants and/or shells of sea animals or the at least two components, selected from the group consisting of saccharides and the derivatives thereof, proteins, amino acids, vitamins and metal ions are added to said spinning solution.

The so obtained spinning solution is spun to form fibers according to known methods, and cellulose fibers according to the invention are obtained.

It has surprisingly been found that, despite the addition of an additive, the cellulose fibers according to the invention show the same excellent properties as cellulose fibers without additives, namely in view of their fineness, breaking force, breaking force variation, elongation, wet elongation, breaking tenacity, wet tenacity, fineness-related loop strength, wet abrasion upon breakage, wet abrasion variation and wet modulus, and have, at the same time, the positive properties conferred by the material from sea plants and/or shells of sea animals or the at least two components, selected from the group consisting of saccharides and the derivatives thereof, proteins, amino acids, vitamins and metal ions. This is especially surprising, as the addition of additives to spinning masses from cellulose, NMMNO and water has the drawback that the same discolor at the temperature of application, are not resistant to storage and incorporate impurities into the final cellulose products.

Furthermore, it could surprisingly be proved that the ionic components incorporated with the material remain in the fiber compound even when subjected to a forming method with an aqueous bath liquid, and do not escape into the spinning bath during the short spinning period.

After the spinning process the pH-value of the produced staple fiber was determined according to the DIN method 54 275. In comparison to a fiber not incorporated with sea plants and/or shells of sea animals the pH-value of the incorporated fiber increased, which indicates the extraction of ionic fiber components. By said property, in connection with the body humidity, the bioactivity of the skin can positively and healthfully be influenced when articles of clothing are worn.

Moreover, it has shown that by the addition of the material from sea plants and/or shells of sea animals or the at least two components, selected from the group consisting of saccharides and the derivatives thereof, proteins, amino acids, vitamins and metal ions, the fibrillation of the fibers, produced according to the lyocell method, is reduced. Thus, the fiber according to the invention, e.g. a cellulose fiber incorporated with algae, can be applied in a more favorable manner during the subsequent textile treatment of the fiber.

Despite the incorporation of a material from sea plants and/or shells of sea animals or the at least two components, selected from the group consisting of saccharides and the derivatives thereof, proteins, amino acids, vitamins and metal ions, which is rich in iron and metal concentrations if a sea plant is concerned, advantageously no disintegration of a spinning solution from cellulose, NMMNO and water is observed. It has, on the contrary, shown that the disintegration temperature of such a spinning solution even increased when material from sea plants and/or shells of sea animals was added. This means that despite the presence of metal ions, no negative influence on the stability of the spinning mass could be observed.

By the incorporation of the material from sea plants and the incorporation of metals connected therewith, therefore, also chemical reactions on the fiber material may be carried out, such as ion exchange processes by the incorporated metal ions (e.g. increase of the hydrogen ion concentration in the fibrous material) or the deacetylation of chitin.

Another advantage conferred upon the molded articles according to the invention by the addition of material from sea plants and/or shells of sea animals or at least two components, selected from the group consisting of saccharides and the derivatives thereof, proteins, amino acids, vitamins and metal ions is the homogenous incorporation of the active substances into the fiber matrix with different producible fiber diameters. Moreover, the processing as monofilament or endless filament yarn is feasible. This results in a particularly favorable application of technical articles.

Especially if the molded article according to the invention is produced from a polymer composition containing exclusively biologically degradable material, the complete biological degradability thereof is an advantage.

The molded articles according to the invention may be used as packaging material, fiber material, nonwoven fabrics, textile compounds, fibrous webs, fiber fleeces, needlefelts, upholstery cotton wool, woven fabrics, knitted fabrics, as home textiles such as bed linen, as filling material, flocking fabric, hospital textiles such as sheets, diapers or mattresses, as fabrics for heating blankets, shoe inserts and dressings. Additional possibilities of using the same are described the Dictionary for textile interior design [*Lexikon der textilen Raumausstattung*], Buch und Medien Verlag Buurmann KG, ISBN 3-98047-440-2.

If a woven fabric is produced from the molded article according to the invention in the form of fibers, it may either consist of said fibers exclusively or contain an additional component. Said additional component can be selected out of the group consisting of cotton wool, lyocell, rayon, carbacell, polyester, polyamide, cellulose acetate, acrylate, polypropylene or mixtures thereof. The fibers containing a material from sea plants and/or shells of sea animals are present in the woven fabric preferably in an amount of up to approximately 70 weight-%. The material from sea plants and/or shells of sea animals or the at least two components, selected from the group consisting of saccharides and the derivatives thereof, proteins, amino acids, vitamins and metal ions are present in the woven fabric preferably in an amount of 1 to 10 weight-%.

If the molded article is provided in the form of a fibrous material or a woven fabric, articles of clothing such as jumpers, jackets, dresses, suits, t-shirts, underwear or the like can be produced therefrom.

The articles of clothing produced from said fibers or woven fabrics according to the invention are extremely comfortable to wear and in general improve the state of health of the individual wearing said article of clothing. The health-improving effect of sea plant materials is, for instance, described in JP 1228916.

Due to the high portion of negative ions in the material from sea plants and/or shells of sea animals or the at least two components, selected from the group consisting of saccharides and the derivatives thereof, proteins, amino acids, vitamins and metal ions the pH-value of the skin is positively influenced in as far as it arranges for alkaline and thus healthy conditions on the skin. In addition, the skin temperature is increased more when wearing the articles of clothing according to the invention, in contrast to wearing an article of clothing made of fibers without the material from sea plants and/or shells of sea animals or the at least two components, selected from the group consisting of saccharides and the derivatives thereof, proteins, amino acids, vitamins and metal ions, whereby a positive effect is exerted on the blood circulation of the skin.

Due to the incorporated elements the fiber according to the invention passes the active substances on to the body, namely via the liquid present during the wearing in response to the body humidity. Due to the cellulosic material articles of clothing having good breathing properties can thus be produced. Moreover, the active substances can purposively be supplied to the skin, as is common in cosmetics or Thalasso therapy. Due to the incorporation the active substances remain in the fiber or the woven fabric for a long time, even after frequent washing.

The minor elements and the vitamins supplied via the woven fabric made of the fibers according to the invention can support the body due to the remineralizing, stimulating and heating effect.

If the fiber according to the invention is provided in the form of staple fibers or disintegrated filaments, surfaces of carriers such as woven fabrics or films can be flocked therewith. For this purpose the surface of the carrier to be flocked is treated with an adhesive and the staple fibers or disintegrated filaments are applied thereon.

The invention will hereinafter by explained by means of examples.

Comparative Example 1

Without Admixture 3,086 g NMMNO (59.8%), 308 g MoDo, DP 500, dry contents 94%, 1.8 propylgallate (0.63% related to the cellulose contents) were mixed, and the so obtained mixture was heated to 94° C. Obtained was a discontinuously produced spinning solution having a cellulose content of 11.8% and a viscosity of 4,765 Pa·s. The so obtained spinning solution was spun to form fibers, whereby the following spinning conditions were observed:

| | |
|---|---|
| Temperature of the store tank = | 90° C. |
| Temperature spinning block, nozzle = | 80° C. |
| Spinning bath = | 4° C. |
| Spinning bath concentration (start) = | 0% (distilled water) |
| Spinning bath concentration (end) = | 5% NMMNO |
| Spinning pump = | 20.0 cm$^3$/min. |
| Nozzle filter = | 19200 M/cm$^2$ |
| Spinning nozzle = | 495 Hole 70 μm; Au/Pt |
| Final drawing-off = | 25 m/min. |

The fibers were cut to a staple length of 40 mm, were washed free of a solvent and finished with a 10 g/l lubrication (50% Leomin OR-50% Leomin WG (nitrogen-containing fatty acid polyglycol ester Clariant GmbH)) at 45° C. or, respectively, the fat add-on for the better continued processing of the fibers was applied, and dried at 105° C. Subsequent to the drying a fiber humidity of 11% was adjusted. An additional bleaching process prior to the drying was not performed in this case.

The spinning behavior of the spinning solution obtained according the present example was good.

TABLE 3

Fiber data comparative example 1

|  |  | Comparative Example 1 |
|---|---|---|
| Fineness - Titer | [dtex] | 1.48 |
| Breaking tenacity dry | [cN/tex] | 42.20 |
| Breaking tenacity wet | [cN/tex] | 36.30 |
| Breaking tenacity loop | [cN/tex] | 15.20 |
| Breaking elongation - dry | [%] | 15.50 |
| Breaking elongation - wet | [%] | 15.20 |
| Wet modulus | [cN/tex] | 202.00 |

Comparative Example 2

Without Admixture: Treatment of the Filaments in the Air Gap

The spinning solution was produced analogously to comparative example 1. The spinning solution was spun to fibers, whereby, in deviation from comparative example 1, the temperature of the spinning block was adjusted to 95° C. and the temperature of the nozzle to 105° C. In the air gap between the nozzle and the coagulating bath the yarn sheet was quenched with humid air (temperature: 20° C., humidity: 70%).

Otherwise, the test performance was carried out like in comparative example 1.

TABLE 4

Fiber data comparative example 2

|  |  | Comparative Example 2 |
|---|---|---|
| Fineness - Titer | [dtex] | 1.25 |
| Breaking tenacity dry | [cN/tex] | 45.10 |
| Breaking tenacity wet | [cN/tex] | 37.10 |
| Breaking tenacity loop | [cN/tex] | 22.10 |
| Breaking elongation - dry | [%] | 15.40 |
| Breaking elongation - wet | [%] | 18.50 |
| Wet modulus | [cN/tex] | 234.00 |

Example 1

3,156 g NMMNO (61.4%), 315 g MoDo, DP 500, dry contents 94%, 1.9 g propylgallate (0.63% related to the cellulose content) as well as 11.6 g of a powder—shown in table 1—(in total 3.9% related to the cellulose content) were mixed and heated to 94° C. Obtained was a spinning solution having a solids content of 12.4% and a viscosity of 6,424 Pa·s. The so produced spinning solution was spun to fibers like in comparative example 1,

TABLE 5

Fiber data example 1

|  |  | Example 1 |
|---|---|---|
| Fineness - Titer | [dtex] | 1.40 |
| Breaking tenacity dry | [cN/tex] | 38.60 |
| Breaking tenacity wet | [cN/tex] | 30.70 |
| Breaking tenacity loop | [cN/tex] | 11.40 |
| Breaking elongation - dry | [%] | 12.40 |
| Breaking elongation - wet | [%] | 13.00 |
| Wet modulus | [cN/tex] | 199.00 |

Example 2

Analogously to example 1, 2.951 g NMMNO (60.84%), 305 g MoDo, DP 500, dry contents 94%, 1.8 g propylgallate (0.63% related to the cellulose content) as well as 17.5 g of the mixture used in table 1—(in total 6.1% related to the cellulose content) were mixed and heated to 94° C. Obtained was a spinning solution having a solids content of 12.9% and a viscosity of 7.801 Pa·s. The so produced spinning solution was spun to fibers like in comparative example 1.

TABLE 6

Fiber data example 2

|  |  | Example 2 |
|---|---|---|
| Fineness - Titer | [dtex] | 1.48 |
| Breaking tenacity dry | [cN/tex] | 36.60 |
| Breaking tenacity wet | [cN/tex] | 32.40 |
| Breaking tenacity loop | [cN/tex] | 13.30 |
| Breaking elongation - dry | [%] | 12.10 |
| Breaking elongation - wet | [%] | 13.50 |
| Wet modulus | [cN/tex] | 188.00 |

Example 3

Analogously to example 1, 2,750 g NMMNO (60.3%), 305 g MoDo, DP 500, dry contents 94%, 1.7 g propylgallate (0.63% related to the cellulose content) as well as 11.2 g of a powder—shown in table 2.2—(in total 4.1% related to the cellulose content) were mixed and heated to 94° C. Obtained was a spinning solution having a solids content of 13% and a viscosity of 6.352 Pa·s. The so produced spinning solution was spun to fibers like in comparative example 1.

TABLE 7

Fiber data example 3

|  |  | Example 3 |
|---|---|---|
| Fineness - Titer | [dtex] | 1.41 |
| Breaking tenacity dry | [cN/tex] | 33.40 |
| Breaking tenacity wet | [cN/tex] | 29.20 |
| Breaking tenacity loop | [cN/tex] | 9.00 |
| Breaking elongation - dry | [%] | 12.60 |
| Breaking elongation - wet | [%] | 8.60 |
| Wet modulus | [cN/tex] | 182.00 |

Example 4

Analogously to example 3, 3,345 g NMMNO (59.5%), 318 g MoDo, DP 500, dry contents 94%, 1.9 g propylgallate (0.63% related to the cellulose content) as well as 23.6 g of a mixture similar to the one used in table 3 (in total 7.9% related to the cellulose content) were mixed and heated to 94° C. The mixture used in this example differs from the one used in example 3 above all by a higher potassium content and a lower calcium content (~12.6% to ~35%). Obtained was a spinning solution having a solids content of 12.4% and a viscosity of 7.218 Pa·s. The so produced spinning solution was spun to fibers like in comparative example 1.

TABLE 8

Fiber data example 4

|  |  | Example 4 |
|---|---|---|
| Fineness - Titer | [dtex] | 1.42 |
| Breaking tenacity dry | [cN/tex] | 41.40 |
| Breaking tenacity wet | [cN/tex] | 32.90 |
| Breaking tenacity loop | [cN/tex] | 8.30 |
| Breaking elongation - dry | [%] | 11.90 |
| Breaking elongation - wet | [%] | 12.00 |
| Wet modulus | [cN/tex] | 212.00 |

Example 5

3,204 g NMMNO (59.5%), 318 g MoDo, DP 500, dry contents 94.4%. 1.9 g propylgallate (0.63% related to the cellulose content) and 25.4 g brown algae (8.5% related to the cellulose content) of the type *Laminaria* were mixed, and the so obtained mixture was heated to 94° C. Obtained was a discontinuously produced spinning solution having a cellulose content of 13.24% and a viscosity of 6.565 Pa·s. The so obtained spinning solution was spun to fibers, whereby the following spinning conditions were observed:

| Temperature of the store tank = | 90° C. |
|---|---|
| Temperature spinning block, nozzle = | 80° C. |
| Spinning bath = | 4° C. |
| Spinning bath concentration (start) = | 0% (distilled water) |
| Spinning bath concentration (end) = | 7% NMMNO |
| Spinning pump = | 20.0 cm³/min. |
| Nozzle filter = | 19200 M/cm² |
| Spinning nozzle = | 495 Hole 70 μm; Au/Pt |
| Final drawing-off = | 30 m/min. |

The fibers were cut to a staple length of 40 mm, were washed free of a solvent and finished with a 10 g/l lubrication (50% Leomin OR-50% Leomin WG (nitrogen-containing fatty acid polyglycol ester Clariant GmbH)) at 45° C. or, respectively, the fat add-on for the better continued processing of the fibers was applied, and dried at 105° C. Subsequent to the drying a fiber humidity of 10% was adjusted. An additional bleaching process prior to the drying was not performed in this case.

The spinning behavior of the spinning solution obtained according the present example was good.

The following table 9 shows the physical properties of the so obtained cellulose fibers.

TABLE 9

| Fineness [dtex] | 1.42 |
|---|---|
| Breaking force [cN] | 5.85 |
| Breaking force variation [%] | 15.8 |
| Elongation [%] | 11.9 |
| Wet elongation [%] | 12.0 |
| Breaking tenacity [cN/tex] | 41.4 |
| Breaking tenacity wet [cN/tex] | 32.9 |
| Loop breaking tenacity [cN/tex] | 8.3 |

TABLE 9-continued

| Wet abrasion upon breakage [turns] | 10 |
|---|---|
| Wet abrasion variation [%] | 19.7 |
| Wet modulus [cN/tex] | 212 |

The elementary analyses of the applied material from sea plants, brown algae *Laminaria digitata* and the fiber sample with incorporated brown algae is shown in the following table 10.

TABLE 10

| Analyses [mg/kg] | Brown algae material | Fiber sample with incorporated brown algae material *Laminaria digitata* |
|---|---|---|
| Sodium | 28,300 | 460 |
| Magnesium | 51,300 | 3,400 |
| Calcium | 126,000 | 8,100 |
| Chromium | 850 | 50 |
| Manganese | 670 | 55 |
| Iron | 32,600 | 2,000 |
| Nickel | 210 | 20 |
| Copper | 30 | 8 |
| Molybdenum | <5 | <5 |
| Cobalt | 19 | <5 |

Figure 2:
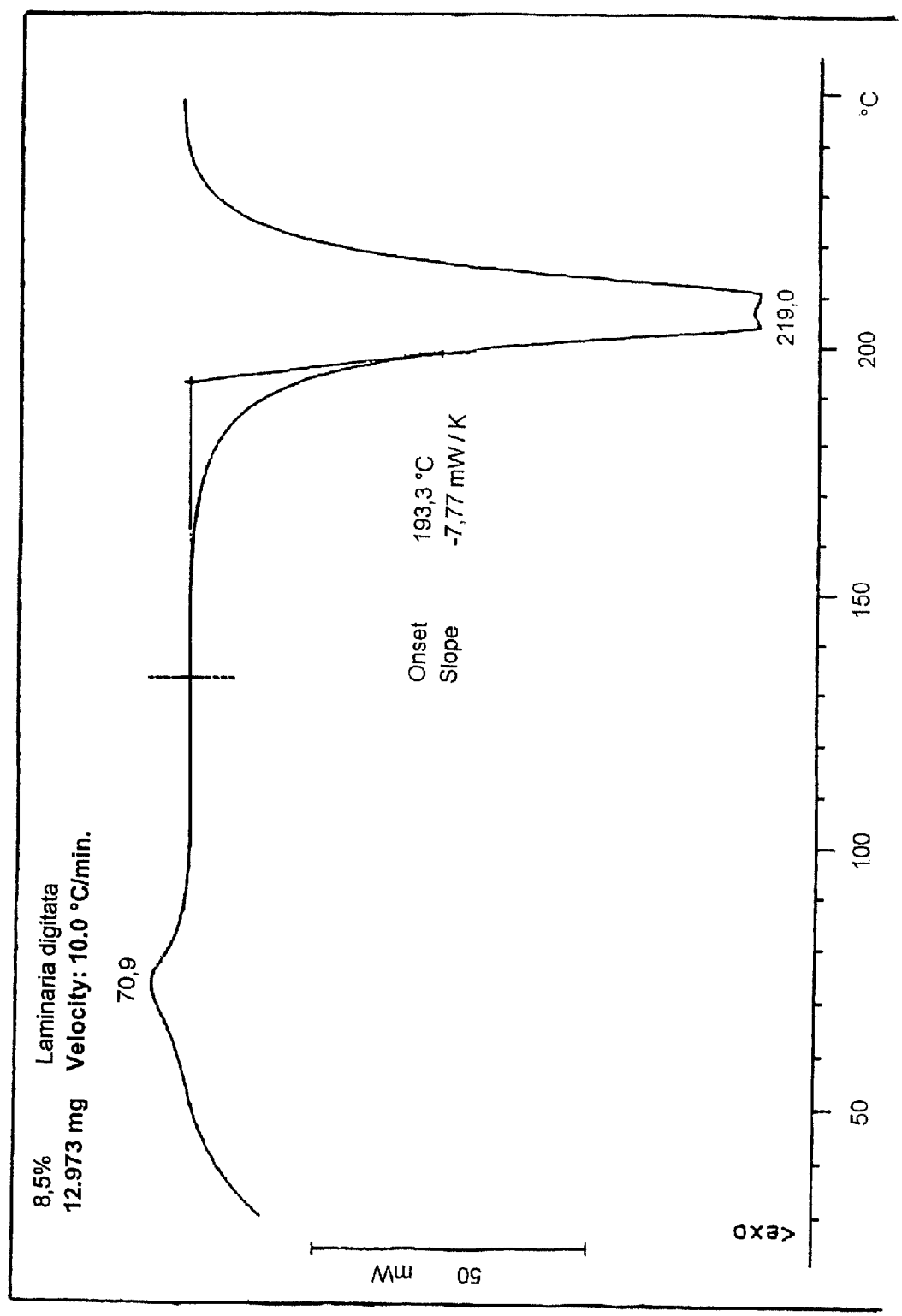
FIG. 2 is a graphical representation showing the stability of a spinning solution with 8.5% *Laminaria digitata* over thermal disintegration up to approximately 200° C.

FIG. 2 moreover shows that a spinning solution with 8.5% *Laminaria digitata* is stable over thermal disintegration up to approximately 200° C.

Example 6

3,687 g NMMNO (62%), 381 g MoDo, DP 500, dry contents 94.4%, 2.27 g propylgallate (0.63% related to the cellulose content) and 3.6 g brown algae flour *Laminaria digitata* (1% related to the cellulose content) were mixed and heated to 94° C. Obtained was a spinning solution having a cellulose content of 12.78% and a viscosity of 8.424 Pa·s. The so produced spinning solution was spun to fibers like in comparative example 1.

The physical properties of the so obtained cellulose fibers are shown in the following table 11.

| Fineness [dtex] | 1.40 |
|---|---|
| Breaking force [cN] | 6.10 |
| Breaking force variation [%] | 21.8 |
| Elongation [%] | 13.0 |
| Wet elongation [%] | 12.7 |
| Breaking tenacity [cN/tex] | 42.4 |
| Breaking tenacity wet [cN/tex] | 37.7 |
| Loop breaking tenacity [cN/tex] | 8.81 |
| Wet abrasion upon breakage [turns] | 14 |
| Wet abrasion variation [%] | 34.7 |
| Wet modulus [cN/tex] | 254 |

Figure 3:
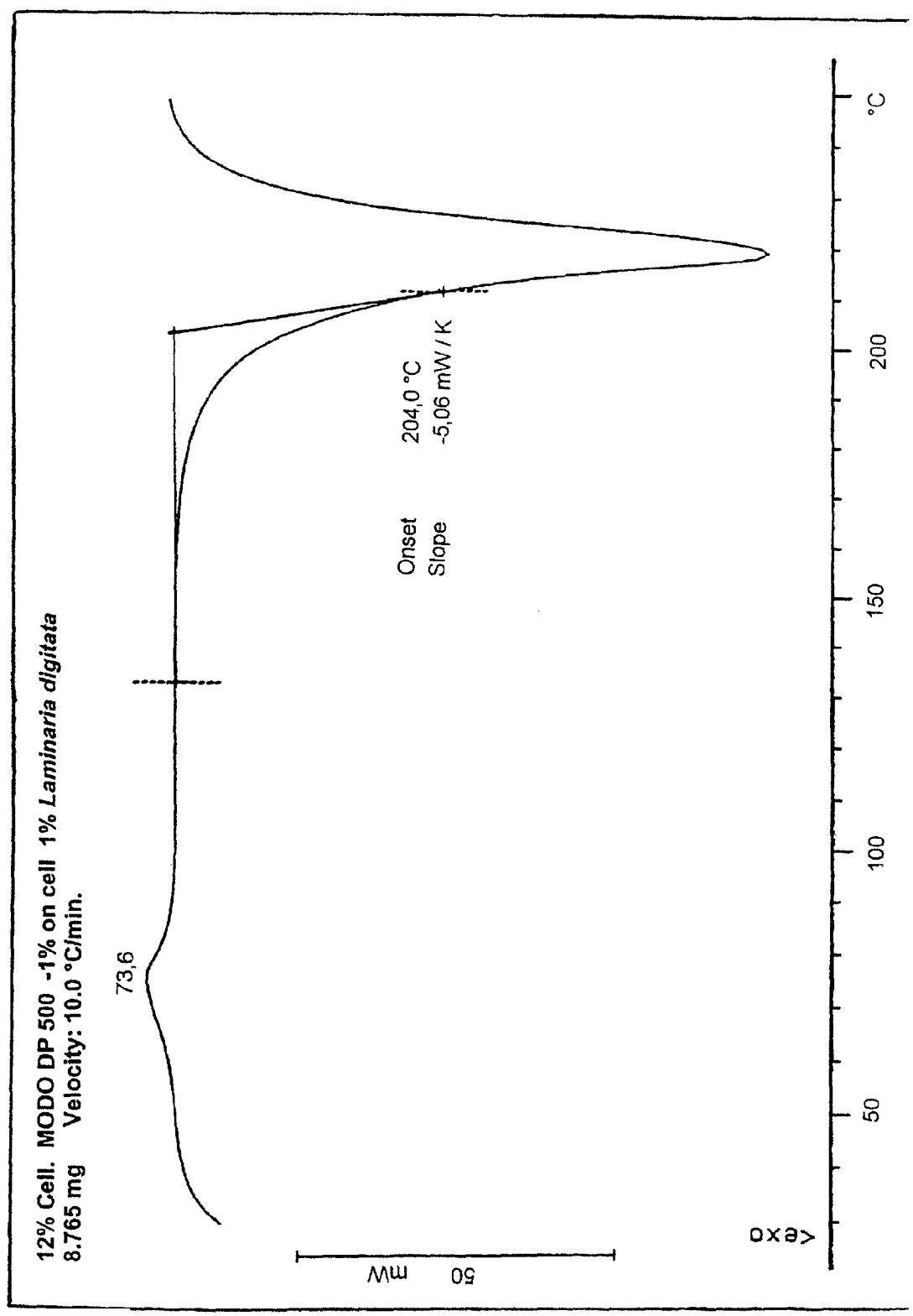
FIG. 3 is a graphical representation showing the stability of a spinning solution with 1% *Laminaria digitata*, related to the cellulose content, up to a temperature of approximately 200° C.

The so obtained fibers were spun to a yarn. The spinning was carried out under the conditions 63% relative air humidity and 20° C. by means of carding, stretching and spinning with a rotor spinning machine, to form 75 g of yarn with approximately 20 tex. FIG. 3 shows that the spinning solution with 1% *Laminaria digitata*, related to the cellulose content, is stable up to a temperature of approximately 200° C.

Example 7

A cellulose xanthogenate was produced from a mixture of 33 weight-% cellulose, 17 weight-% caustic soda solution and 50 weight-% water by adding 32% carbon disulfide related to cellulose. Thereafter the xanthogenate was transferred by stirring for 2 hours, with the addition of diluted caustic soda solution, into a spinning solution with 6 weight-% cellulose, 6 weight-% NaOH and substantially water and reaction products resulting from the xanthate production. To the so obtained viscose solution 0.9 weight-% of brown algae material were added to the spinning solution. The viscose solution was allowed to stand for approximately 6 hours under a vacuum for degassing and thereupon filtrated. The so obtained viscose solution had a maturity level of 100 Hottenroth and was spun to fibers.

The spinning conditions were:

| | |
|---|---|
| Nozzle [n/μm] | 1,053/60 |
| Hole throughput [g/hole/min.] | 0.07 |
| Temperature of coagulating bath [° C.]. | 30 |
| Sulfuric acid in the coagulating bath [%] | 10.8 |
| Sodium sulfate in the coagulating bath [%] | 20.0 |
| Zinc sulfate in the coagulating bath [%] | 1.5 |
| Drawing-off speed [m/min.] | 36 |

The physical properties of the so obtained rayon fibers are shown in the following table 12.

TABLE 12

| | |
|---|---|
| Fineness - Titer [dtex] | 1.7 |
| Breaking tenacity dry [cN/tex] | 21.7 |
| Breaking tenacity wet [cN/tex] | 12.4 |
| Fineness-related loop strength [cN/tex] | 6.0 |
| Breaking elongation - dry [%] | 14.2 |
| Breaking elongation - wet [%] | 15.8 |
| Wet modulus [cN/tex] | 2.9 |

Example 8

Rayon fibers were produced in accordance with example 7, except for the fact that 0.1 weight-% of brown algae material instead of 0.9 weight-% were added to the spinning solution.

The physical properties of the so obtained viscose or rayon fibers are shown in table 13.

TABLE 13

| | |
|---|---|
| Fineness - Titer [dtex] | 1.7 |
| Breaking tenacity dry [cN/tex] | 23.7 |
| Breaking tenacity wet [cN/tex] | 14.1 |
| Loop strength [cN/tex] | 6.5 |
| Breaking elongation - dry [%] | 16.9 |
| Breaking elongation - wet [%] | 18.5 |
| Wet modulus [cN/tex] | 3.0 |

Comparative Example 3

As comparison, a viscose fiber was produced in accordance with example 7, except for the fact that no brown algae material was added.

The physical properties of said viscose fiber are shown in table 14.

TABLE 14

| | |
|---|---|
| Fineness - Titer [dtex] | 1.7 |
| Breaking tenacity dry [cN/tex] | 24.8 |
| Breaking tenacity wet [cN/tex] | 14.2 |
| Loop strength [cN/tex] | 6.4 |
| Breaking elongation - dry [%] | 17.2 |

TABLE 14-continued

| | |
|---|---|
| Breaking elongation - wet [%] | 21.1 |
| Wet modulus [cN/tex] | 2.9 |

Example 9

For the production of cellulose carbamate an alkali cellulose was first produced from a chemical pulp with 92-95% alpha-content (Ketchikan). The caustic soda solution was washed out of the matured alkali cellulose (35 weight-% cell; 15 weight-% NaOH; 50 weight-% water) with water. After squeezing out the so activated cellulose (70 weight-% water) 10 kg of the squeezed out activated cellulose were mixed with urea (1.5 kg) in a kneader. The urea is thereby separated in the water contained in the cellulose and is evenly distributed in the cellulose. Said cellulose pulp was transferred into a reactor equipped with stirrer and reflux cooler, into which o-xylol (30 kg) had been fed. The contents in the reactor was then heated for approximately 2 hours at 145° C. and filtered off.

The so obtained residue was passed back into the reactor, into which approximately 25 kg water had been fed. The xylol still adhering to the carbamate was stripped off at 88° C. After the filtration the carbamate was washed out with hot water (50° C.) and with cold water. Thereafter the carabamate was squeezed out.

3.45 kg Stark-solution were produced from 1.02 kg of said carbamate with 1.1 kg caustic soda solution (30 weight-%), 1.30 kg water and with the corresponding amount of brown algae (0.03 kg). All reactants were pre-cooled. The reaction itself took place at a temperature of 0° C. (Composition of the Stark-lye: 11.0 weight-% cell, 9.5 weight-% NaOH).

A spinning mass (5 kg) was produced from the cooled Stark-solution by adding 1.55 kg cooled caustic soda solution (3.03 weight-%) at a temperature of 0° C. The cooled spinning mass was filtrated through a filter with degrees of fineness of 10-40 μm and was spun.

The following spinning conditions were observed:

| | |
|---|---|
| Nozzle [n/μm] | 36/60 |
| Hole throughput [g/hole/min.] | 0.11 |
| Temperature of coagulating bath [° C.] | 35 |
| Sulfuric acid in the coagulating bath [%] | 90 |
| Sodium sulfate in the coagulating bath [%] | 140 |
| Drawing-off speed [m/min.] | 30 |

The physical properties of the so obtained CARBACELL® fibers are shown in table 15.

TABLE 15

| | |
|---|---|
| Fineness - Titer [dtex] | 3.1 |
| Breaking tenacity dry [cN/tex] | 14.8 |
| Breaking tenacity wet [cN/tex] | 5.7 |
| Loop strength [cN/tex] | 7.5 |
| Breaking elongation - dry [%] | 4.0 |
| Breaking elongation - wet [%] | 4.7 |
| Wet modulus [cN/tex] | 100 |

Example 10

CARBACELL® fibers were produced in accordance with example 9, except for the fact that 0.1 weight-% of brown algae flour instead of 0.6 weight-% were added to the spinning mass.

The physical properties of the so obtained CARBACELL® fibers are shown in the following table 16.

| | |
|---|---|
| Fineness - Titer [dtex] | 3.3 |
| Breaking tenacity dry [cN/tex] | 17.8 |
| Breaking tenacity wet [cN/tex] | 5.8 |
| Loop strength [cN/tex] | 7.5 |
| Breaking elongation - dry [%] | 4.6 |
| Breaking elongation - wet [%] | 5.4 |
| Wet modulus [cN/tex] | 129 |

Comparative Example 4

CARBACELL® fibers were produced in accordance with example 9, except for the fact that no brown algae flour was added.

The physical properties of the so obtained fibers are shown in the following table 17.

TABLE 17

| | |
|---|---|
| Fineness - Titer [dtex] | 3.1 |
| Breaking tenacity dry [cN/tex] | 18.0 |
| Breaking tenacity wet [cN/tex] | 5.8 |
| Loop strength [cN/tex] | 7.9 |
| Breaking elongation - dry [%] | 4.7 |
| Breaking elongation - wet [%] | 5.5 |
| Wet modulus [cN/tex] | 135 |

Examples 11 to 15

Lyocell cellulose fibers were continuously produced in accordance with example 5, whereby the respective amounts, the conditions of the continuously performed process and the physical properties of the obtained fibers are shown in the following table 18.

TABLE 18

| Pulp | Unit | Example 11 | Example 12 | Example 13 | Example 14 | Example 15 |
|---|---|---|---|---|---|---|
| Type | | Alicell VLV | Modo Drown Dissolving | Alicell VLF | Alicell VLV | Alicell VLV |
| DP Pulp | | 540 | 530 | 540 | 540 | 540 |
| Feed hole | kg/h | 161.8 | 161.8 | 173.0 | 167.2 | 161.7 |
| Cellulose | %. | 13.0% | 13.0% | 12.0% | 12.5% | 13.0% |
| Water | % | 10.7% | 10.7% | 11.3% | 11.0% | 10.7% |
| NMMO | % | 76.3% | 76.3% | 76.7% | 76.5% | 76.3% |
| Solution flow | kg/h | 138.5 | 138.5 | 150.0 | 144.0 | 138.5 |
| Vapor condensate | kg/h | 23.3 | 23.3 | 23.0 | 23.2 | 23.3 |
| System pressure | mbar abs. | 55 | 55 | 55 | 55 | 55 |
| Spinning temp. | ° C. | 117 | 110 | 72 | 80 | 117 |
| Fiber draft | | 10.9 | 10.9 | 4.3 | 10.5 | 11.81 |
| Titer | dtex | 1.3 | 1.3 | 1.3 | 1.3 | 1.18 |
| Air gap height | mm | 20 | 20 | 7 | 12 | 20 |
| Air quantity | Nm³/h | 130 | 130 | 130 | 180 | 135 |
| Air temperature | ° C. | 17.5 | 18.5 | 17.2 | 17.9 | 19 |
| Hole throughput | g/hole min | 0.030 | 0.060 | 0.028 | 0.134 | 0.028 |
| Hole diameter | μ | 100 | 100 | 65 | 100 | 100 |
| Brown algae powder Amount | g/h | 181.9 | 182.3 | 1528.0 | 1531.8 | 2704.0 |
| Coagulating bath temperature | ° C. | 20 | 20 | 6 | 6 | 20 |
| Spinning bath concentration | % NMMO | 20 | 20 | 20 | 20 | 20 |
| Final drawing-off | m/min | 35 | 70 | 30 | 150 | 35 |
| Titer | dtex | 1.40 | 1.42 | 1.38 | 1.40 | 1.21 |
| Strength dry | cn/tex | 42.1 | 41.4 | 41.8 | 42.4 | 41 |
| Elongation dry | % | 12.8 | 11.9 | 13.0 | 13.2 | 13.8 |
| Wet strength | cn/tex | 32.9 | 34.8 | 37.7 | 37.7 | 33.4 |
| Wet elongation | % | 12.0 | 12.3 | 12.7 | 12.0 | 12.8 |
| Loop strength | cn/tex | 15.4 | 13 | 8.3 | 8.9 | 13.8 |
| Wet modulus | cn/tex | 238 | 254 | 212 | 212 | 242 |

Example 16

Based on the fibers produced in accordance with comparative example 1 and 2 and in accordance with examples 1 to 4 cryo-breaks in liquid nitrogen were produced, whereof photographs were taken by means of a field emission electron-scanning microscope (Joel 6330 F) after the fibers had been sputtered with platinum.

The fiber produced according to comparative example 1 or 2 according to the standard process shows a splinted break. The fibrillary structure can clearly be recognized on the broken surface. The strong orientation of the fibrilla can be seen on the standing out longitudinal ridges and on the strongly fissured structure along the longitudinal axis.

The photographs of the fibers from examples 1 to 4 show something completely different. The partly blunt and clean broken surfaces can clearly be recognized. Moreover, it can be recognized that the distinct high longitudinal orientation in the fiber according to comparative example 1 is much less distinct in examples 1 to 4.

On the basis of the electron-scanning microscope photographs striking differences in the structure of the fiber were detected.

Above all, the strongly repressed longitudinal orientation shows that the use according to the invention of material from sea plants and/or shells of sea animals or of at least two components selected from the group consisting of saccharides and the derivatives thereof, proteins, amino acids, vitamins and metal ions results in a smaller fibrillation of the fibers during the production of cellulose fibers.

It had been especially interesting and unexpected that mixtures with different substances contained therein show said effect, as all previously known defibrillation agents are cross-linking agents. The smaller fibrillation is presumably due to a change of the crystallization properties of the cellulose during the extrusion.

The invention claimed is:

1. A method of preparing a polymer composition comprising:
    dissolving a biologically degradable polymer selected from the group consisting of cellulose, carboxyethyl cellulose, methyl cellulose, and mixtures thereof in a solvent comprising a component selected from the group consisting of DMAc, DMSO, DMF, LiCl, tertiary amine oxide and mixtures thereof; and
    mixing the dissolved biologically degradable polymer with sea plant particles, ground shells of sea animals, or both to produce a polymer composition.

2. The method according to claim 1, wherein the sea plant particles comprise at least one of algae, kelp, seaweed and mixtures thereof.

3. The method according to claim 2, wherein the sea plant particles comprise at least one of brown algae, green algae, red algae, blue algae and mixtures thereof.

4. The method according to claim 1, wherein the ground shells of sea animals comprise at least one of sea sediments and ground shells of shrimps, crabs, lobsters, crawfish, crustaceans and mussels and mixtures thereof.

5. The method according to claim 1, wherein the sea plant particles, ground shells of sea animals or both is provided in an amount of 0.1 to 30 weight-% based on the weight of the biologically degradable polymer.

6. The method according to claim 1, wherein the biologically degradable polymer comprises cellulose and the sea plant particles comprise algae.

7. The method according to claim 1, wherein the polymer composition comprises at least a portion of a molded article.

8. The method according to claim 7, wherein the molded article comprises at least a portion of a woven fabric.

9. The method according to claim 7, wherein the molded article comprises at least a portion of a nonwoven fabric.

10. The method according to claim 7, wherein the molded article comprises at least a portion of an article of clothing.

11. The method according to claim 7, wherein the molded article is selected from the group consisting of tanks, films, membranes, woven fabrics and fibers.

12. The method according to claim 11, wherein the fibers include at least one of staple fibers, monofilaments or endless filaments.

13. The method according to claim 7, wherein the molded article comprises at least a portion of a packaging material.

14. The method according to claim 7, wherein the molded article comprises at least a portion of yarn.

15. The method according to claim 8, wherein the woven fabric further comprises a component selected from the group consisting of cotton wool, lyocell, rayon, carbacell, polyester, polyamide, cellulose acetate, acrylate, polypropylene, or mixtures thereof.

16. The method according to claim 15, wherein the woven fabric comprises 0.1 to 30% by wt. of the additional component.

17. The method according to claim 9, wherein the nonwoven fabric further comprises a component selected from the group consisting of cotton wool, lyocell, rayon, carbacell, polyester, polyamide, cellulose acetate, acrylate, polypropylene, or mixtures thereof.

18. The method according to claim 17, wherein the nonwoven fabric comprises 0.1 to 30% by wt. of the additional component.

19. The method of claim 1, wherein the solvent comprises NMMNO.

20. The method of claim 1, wherein the solvent further comprises water.

21. The method of claim 1, wherein the biologically degradable polymer is mixed with sea plant particles having a particle size of approximately 6 µm to approximately 10 µm.

22. The method of claim 1, wherein at least one of the sea plant particles or ground shells of sea animals have a particle size in the range of 200 µm to 400 µm or 150 µm to 300 µm.

23. The method of claim 1, wherein at least one of the sea plant particles or ground shells of sea animals have a particle size of 1 µm to 100 µm.

24. The method of claim 1, wherein at least one of the sea plant particles or ground of sea animals have a particle size of 0.1 µm to 10 µm.

25. The method of claim 1, wherein at least one of the sea plant particles or ground shells of sea animals have a particle size of 0.1 µm to 7 µm.

26. The method of claim 1, wherein at least one of the sea plant particles or ground shells of sea animals have a particle size of 1 µm to 5 µm.

* * * * *